(12) United States Patent
Yamazaki et al.

(10) Patent No.: US 10,858,043 B2
(45) Date of Patent: Dec. 8, 2020

(54) LOCK MECHANISM OF ACTUATOR (71) Applicant: HONDA MOTOR CO., LTD., Tokyo (JP)

(72) Inventors: Ryosuke Yamazaki, Wako (JP); Takumi Inagaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 16/200,912

(22) Filed: Nov. 27, 2018

(65) Prior Publication Data
US 2019/0161122 A1 May 30, 2019

(30) Foreign Application Priority Data

Nov. 28, 2017 (JP) .................. 2017-227984

(51) Int. Cl.
*B62D 17/00* (2006.01)
*B62D 7/14* (2006.01)
*B60G 1/00* (2006.01)

(52) U.S. Cl.
CPC .............. *B62D 17/00* (2013.01); *B60G 1/00* (2013.01); *B62D 7/146* (2013.01); *B62D 7/148* (2013.01)

(58) Field of Classification Search
CPC ........ B62D 7/146; B62D 7/148; B62D 17/00; B60G 1/00; B60G 2202/40; B60G 2202/42; B60G 2200/144; B60G 2200/462; B60G 2200/4622; B60G 3/20; B60G 2204/46; B60G 17/005; B60G 17/0162
See application file for complete search history.

(56) References Cited

U.S. PATENT DOCUMENTS 7,766,345 B2 * 8/2010 Hakui .................... B60G 7/006
  280/5.521
7,766,350 B2 * 8/2010 Terada .................... B60G 3/20
  280/86.757

(Continued)

FOREIGN PATENT DOCUMENTS

JP       4286444 B2      7/2009
JP    2010276166 A   * 12/2010

(Continued)

OTHER PUBLICATIONS

Japanese Office Action dated May 21, 2019, 3 pages.

*Primary Examiner* — Laura Freedman
(74) *Attorney, Agent, or Firm* — Rankin, Hill & Clark LLP (57) ABSTRACT

A lock mechanism is provided in an actuator capable of changing a toe angle of a wheel by rotational drive of a motor and adapted to lock operation of the actuator when the rotational drive of the motor is stopped. The lock mechanism includes a casing secured to a housing of the actuator, an input-side shaft connected to a motor shaft of the motor and rotatably held in the casing, an output-side shaft to which rotational torque is transmitted from the input-side shaft, and an engaging part. The engaging part includes a pair of friction members displaceably provided along a guide groove, a claw part having an acute shape in cross section and a side end part which are provided on the input-side shaft, an abutting part provided on each friction member, and a coil spring for urging each friction member.

4 Claims, 10 Drawing Sheets

(56) References Cited

U.S. PATENT DOCUMENTS

| | | | | |
|---|---|---|---|---|
| 7,871,084 B2 * | 1/2011 | Hakui | ............... | B60G 7/006 |
| | | | | 280/5.521 |
| 7,950,301 B2 * | 5/2011 | Yamaguchi | ............ | B60G 7/006 |
| | | | | 74/89.23 |
| 7,980,982 B2 * | 7/2011 | Yuta | ............... | B60G 7/003 |
| | | | | 475/149 |
| 7,990,003 B2 * | 8/2011 | Suyama | ............ | B60G 7/006 |
| | | | | 280/5.522 |
| 7,997,596 B2 * | 8/2011 | Yuta | ............... | B60G 3/20 |
| | | | | 280/5.52 |
| 8,011,675 B2 * | 9/2011 | Suyama | ............ | B62D 5/0418 |
| | | | | 280/5.522 |
| 8,516,914 B2 * | 8/2013 | Osterlanger | ............ | B60G 7/006 |
| | | | | 188/129 |
| 8,943,916 B2 * | 2/2015 | Osterlaenger | ............ | B60G 7/006 |
| | | | | 192/223.4 |
| 9,643,643 B2 * | 5/2017 | Fujita | ............... | B62D 5/0448 |
| 9,643,644 B2 * | 5/2017 | Fujita | ............... | B62D 5/0433 |
| 2015/0069730 A1 | 3/2015 | Kawauchi et al. | | |
| 2016/0167709 A1 | 6/2016 | Pfeiffer | | |
| 2016/0185383 A1 | 6/2016 | Fujita et al. | | |

FOREIGN PATENT DOCUMENTS

| | | | | |
|---|---|---|---|---|
| JP | 5815620 B2 | 11/2015 | | |
| JP | 2016-121782 A | 7/2016 | | |
| WO | WO-2006117343 A1 * | 11/2006 | ............ | B62D 7/146 |

* cited by examiner

LOCK MECHANISM OF ACTUATOR

CROSS-REFERENCE TO RELATED APPLICATION

This application is based upon and claims priority from the Japanese Patent Application No. 2017-227984, filed on Nov. 28, 2017, the entire contents of which are incorporated herein by reference.

BACKGROUND OF THE INVENTION

1. Field of the Invention

The present invention relates to a lock mechanism of an actuator, which is provided in the actuator capable of changing a toe angle of a wheel by rotational drive of a motor and adapted to inhibit operation of the actuator.

2. Description of the Related Art

As an example of conventional art, Patent document 1 (Japanese Patent No. 5815620) discloses a friction brake type lock mechanism in which a tip surface of a solenoid pin of an electromagnetic solenoid is pressed against an outer peripheral surface of a rotating body to allow the rotation to be regulated.

Moreover, as another example, Patent document 2 (Japanese Patent No. 4286444) discloses a lock mechanism in which a wedge space is formed between the cam surface provided on the output shaft and the inner peripheral surface on the outer ring, and rollers (engaging elements) inserted into the wedge space cause wedging action to be generated to allow rotation of the rotating member to be locked.

The friction brake type lock mechanism disclosed in Patent document 1 allows the electromagnetic solenoid to be brought into an on-state simultaneously with turning-on (IG-ON) of the ignition switch of the vehicle. This causes the solenoid pin, which has been pressed against the outer peripheral surface of the rotating body, to be pulled out to allow the lock state to be released. For this reason, the friction brake type lock mechanism disclosed in Patent document 1 has posed a problem in that the electromagnetic solenoid consumes some electric power at all times during the period of IG-ON.

Moreover, the lock mechanism disclosed in Patent document 2 requires a large torque for releasing a lock state which is generated by mutual engagement of the rollers in the wedge space. Furthermore, the lock mechanism disclosed in Patent document 2 requires releasing the engagement state of the rollers in the wedge space and thus has posed a problem in that time taken to switch from the lock state to the lock release state may be prolonged to lower responsiveness.

The present invention has therefore been made in view of the above problems, and an object of the present invention is to provide a lock mechanism of an actuator which employs a mechanical system not requiring electric power and does not require a large torque in releasing lock.

SUMMARY OF THE INVENTION

In order to attain the above object, according to an aspect of the present invention, a lock mechanism of an actuator reflecting one aspect of the present invention, which is provided in the actuator capable of changing a toe angle of a wheel by rotational drive of a motor and configured to lock operation of the actuator when the rotational drive of the motor is stopped, includes: a casing provided integrally with or separately from a housing of the actuator; an input-side shaft connected to a motor shaft of the motor and rotatably held in the casing; an output-side shaft to which rotational torque is transmitted from the input-side shaft; and a locking part that includes: at least one friction member; a pressing part and a side end part each provided on the input-side shaft; an abutting part provided on the friction member; and an urging member for urging the friction member, wherein when the rotational drive of the motor is stopped, an urging force of the urging member causes the friction member to abut on the casing to be brought into a friction lock state; when the motor is driven to rotate, the pressing part of the input-side shaft abuts on and presses the abutting part of the friction member to allow the friction member to be away from the casing so as to release the friction lock state; and after the friction lock state is released, the side end part abuts on the friction member and the rotational torque of the motor is transmitted from the input-side shaft to the output-side shaft to allow the toe angle of the wheel to be changed.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

Hereinafter, one or more embodiments of the present invention will be described in detail with reference to the drawings as necessary.

Figure 1:
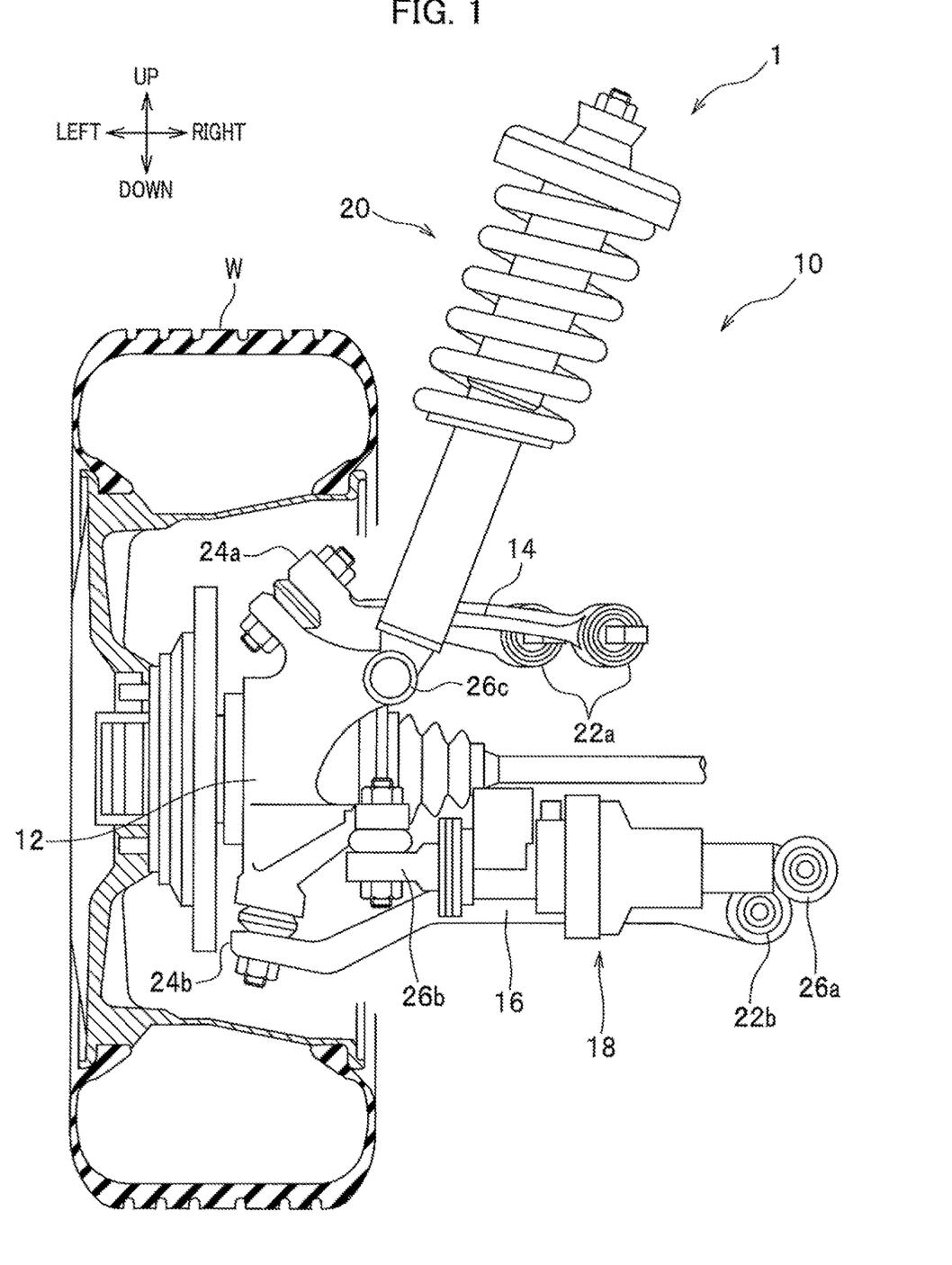
FIG. 1 is a partially broken side view of a rear suspension device in which a lock mechanism of a toe control actuator according to an embodiment of the present invention is incorporated.

FIG. 1 is a partially broken side view of a rear suspension device in which a lock mechanism of a toe control actuator according to an embodiment of the present invention is incorporated. Note that "up-down" and "right-left" indicated by arrows in the figure indicate an up-down direction (vertically up-down direction) of a vehicle and a vehicle width direction (right-left direction), respectively.

As shown in FIG. 1, a rear suspension device 10 is, for example, of a double wishbone type, and is disposed on a rear wheel W (only a left rear wheel W is shown in FIG. 1) of a four-wheel steering vehicle (not shown). The rear suspension device 10 includes a knuckle 12, an upper arm 14 and a lower arm 16, a toe control actuator (telescopic actuator) 18, and a damper 20 with a suspension spring.

The knuckle 12 supports the rear wheel W to allow the rear wheel W to be freely rotated. The upper arm 14 and the lower arm 16 connect the knuckle 12 to a vehicle body frame (not shown) to allow the knuckle 12 to be vertically movable. The toe control actuator 18 connects the knuckle 12 and the vehicle body frame (not shown) to each other in order to control a toe angle of the rear wheel W. The damper 20 with the suspension spring is adapted to absorb a vertical motion of the rear wheel W.

Base ends of the upper arm 14 and the lower arm 16 are connected to the vehicle body frame (not shown) through rubber bush joints 22a, 22b, respectively. Tip ends of the upper arm 14 and the lower arm 16 are connected to an upper part and a lower part of the knuckle 12 through ball joints 24a, 24b, respectively.

A base end of the toe control actuator 18 is connected to the vehicle body frame (not shown) through a rubber bush joint 26a. A tip end of the toe control actuator 18 is connected to a rear part of the knuckle 12 through a rubber bush joint 26b.

An upper end of the damper 20 with the suspension spring is fixed to the vehicle body (e.g., an upper wall of a suspension tower). A lower end of the damper 20 with the suspension spring is connected to the upper part of the knuckle 12 through a rubber bush joint 26c.

When the toe control actuator 18 is driven in the expansion direction, the rear part of the knuckle 12 is pushed outward in the vehicle width direction to allow the toe angle of the rear wheel W to change in a toe-in direction. In contrast, when the toe control actuator 18 is driven in the contraction direction, the rear part of the knuckle 12 is pulled inward in the vehicle width direction to allow the toe angle of the rear wheel W to change in a toe-out direction. Therefore, when the toe angle of the rear wheel W is controlled depending on a vehicle speed and/or a steering angle of a steering wheel (not shown) in addition to normal steering of a front wheel by operation of the steering wheel, linear advancement stability and turning performance of the vehicle can be enhanced.

Figure 2:
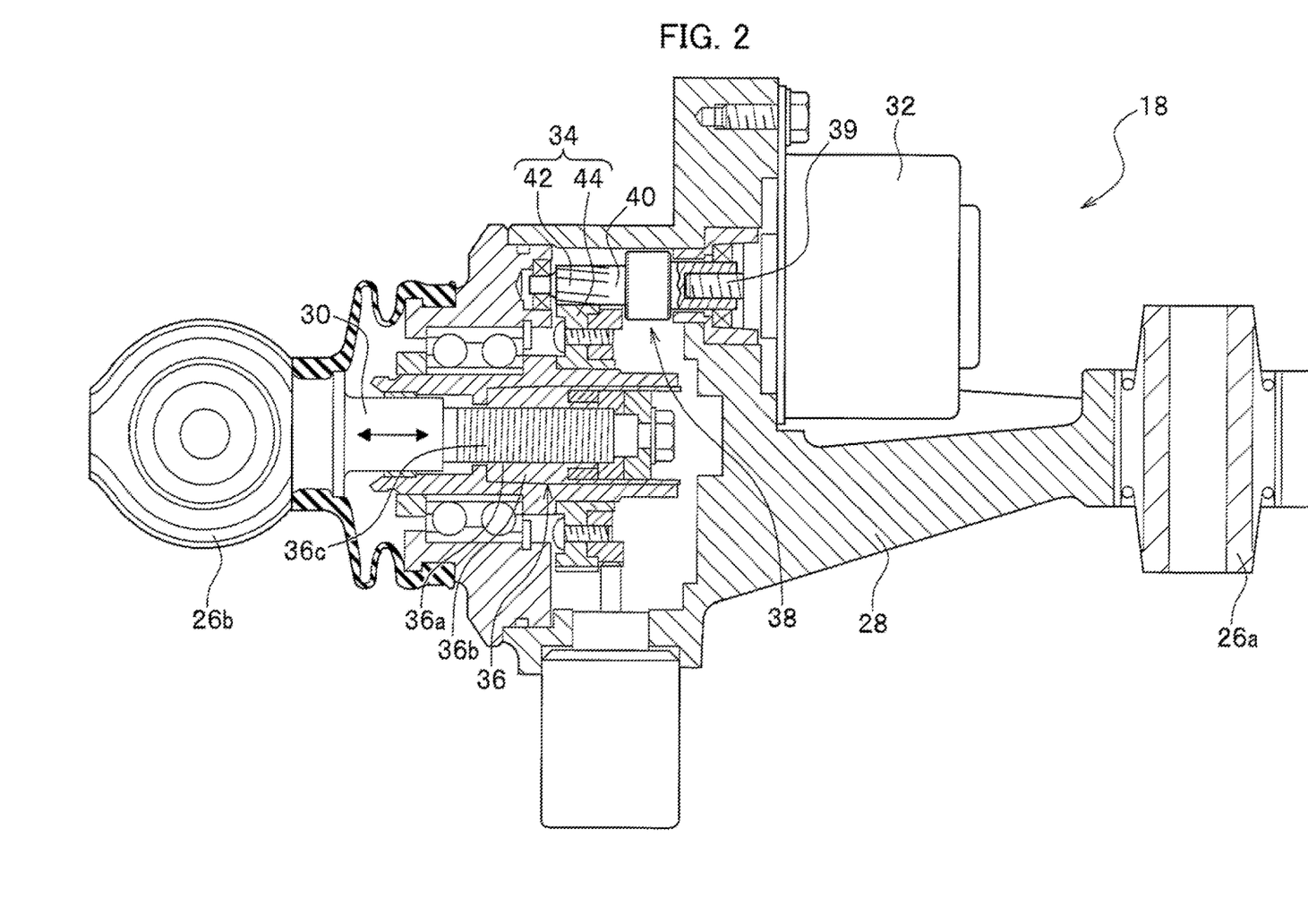
FIG. 2 is a longitudinal section view along an axial direction of the toe control actuator shown in FIG. 1.

FIG. 2 is a longitudinal section view along an axial direction of the toe control actuator shown in FIG. 1. Hereinafter, an outline structure of the toe control actuator 18 will be described with reference to FIG. 2.

The toe control actuator 18 includes a housing 28 and a rod 30. The housing 28 is provided integrally with the rubber bush joint 26a connected to the vehicle body. The rod 30 is provided integrally with the rubber bush joint 26b connected to the knuckle 12. The rod 30 is provided so as to be freely moved forward and backward along an arrow direction. The housing 28 is provided with a motor 32 with a brush that functions as a driving source, a reduction gear 34, a feed screw mechanism 36, and a lock mechanism 38.

Note that, although the present embodiment illustrates a case in which the lock mechanism 38 is applied to the telescopic actuator (toe control actuator 18) provided with the feed screw mechanism 36 that is adapted to expand and contract the rod 30, application of the lock mechanism 38 is not limited to this case. For example, the lock mechanism 38 can be applied to a rotary actuator 102 as described later.

The motor 32 includes a stator (not shown) fixed to a motor housing, a rotor (not shown) supported so as to be freely rotated inside the stator, a motor shaft 39 supported so as to be freely rotated integrally with the rotor, and a rotating shaft 40 coaxially coupled to the motor shaft 39 so as to be freely rotated integrally with the motor shaft 39. The rotating shaft 40 is coupled to the reduction gear 34. The reduction gear 34 includes multiple gears (two gears 42, 44 are shown in FIG. 2).

One gear 42 is directly coupled to the rotating shaft 40 to be rotated integrally with the rotating shaft 40. The other gear 44 is formed with a diameter (addendum circle diameter) larger than the one gear 42. The one gear 42 and the other gear 44 are engaged via gear teeth with each other. The reduction gear 34 is adapted to reduce a rotational speed which is input through the one gear 42 integral with the rotating shaft 40, and to output the reduced rotational speed through the other gear 44.

The reduction gear 34 is connected to the feed screw mechanism 36. The feed screw mechanism 36 includes a feed screw part 36a, a feed screw nut part 36b and an output rod 36c, and has a function of converting a rotary motion input via the reduction gear 34 into a linear reciprocating motion of the output rod 36c.

Figure 3:
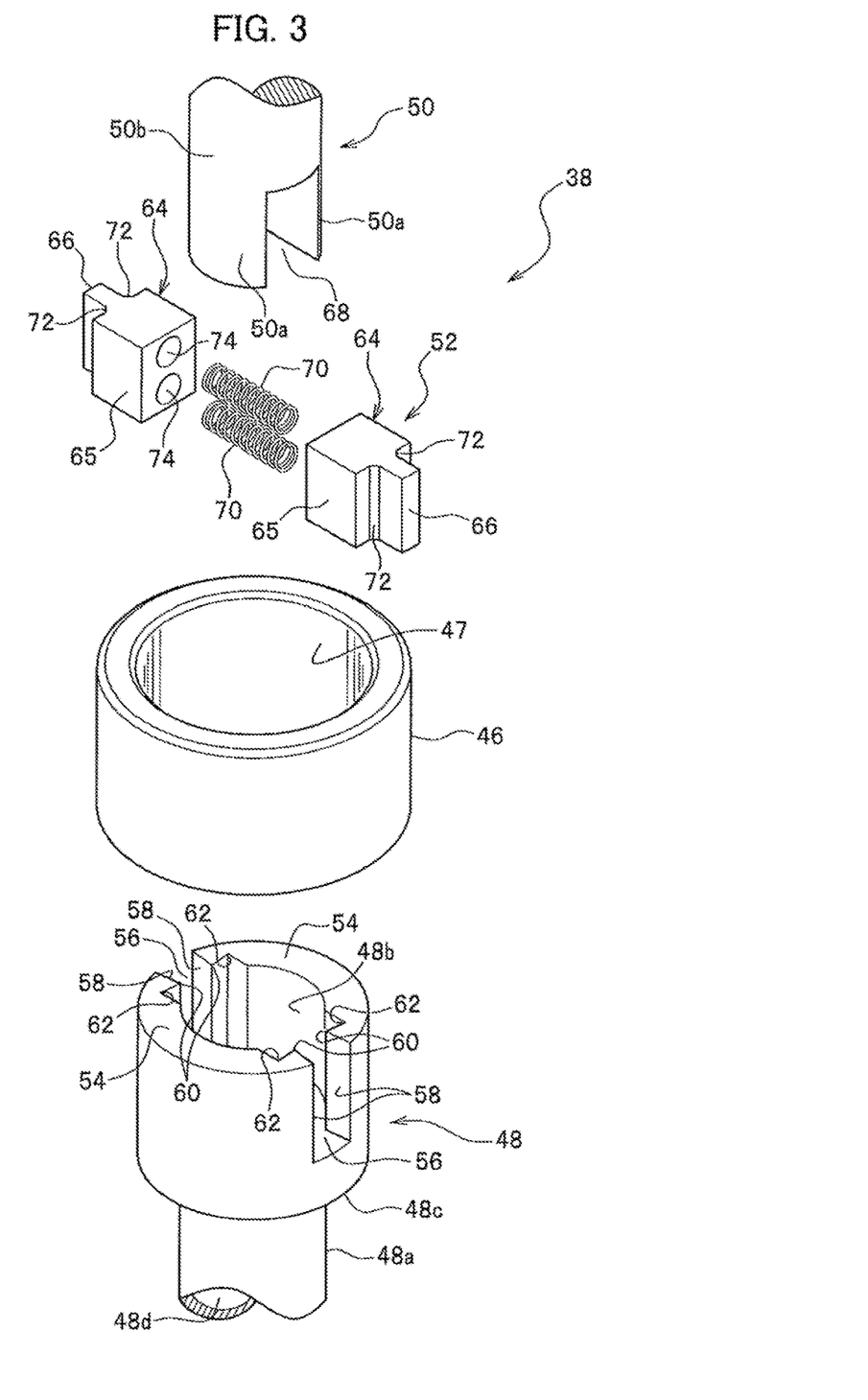
FIG. 3 is an enlarged and exploded perspective view of the lock mechanism.
Figure 4:
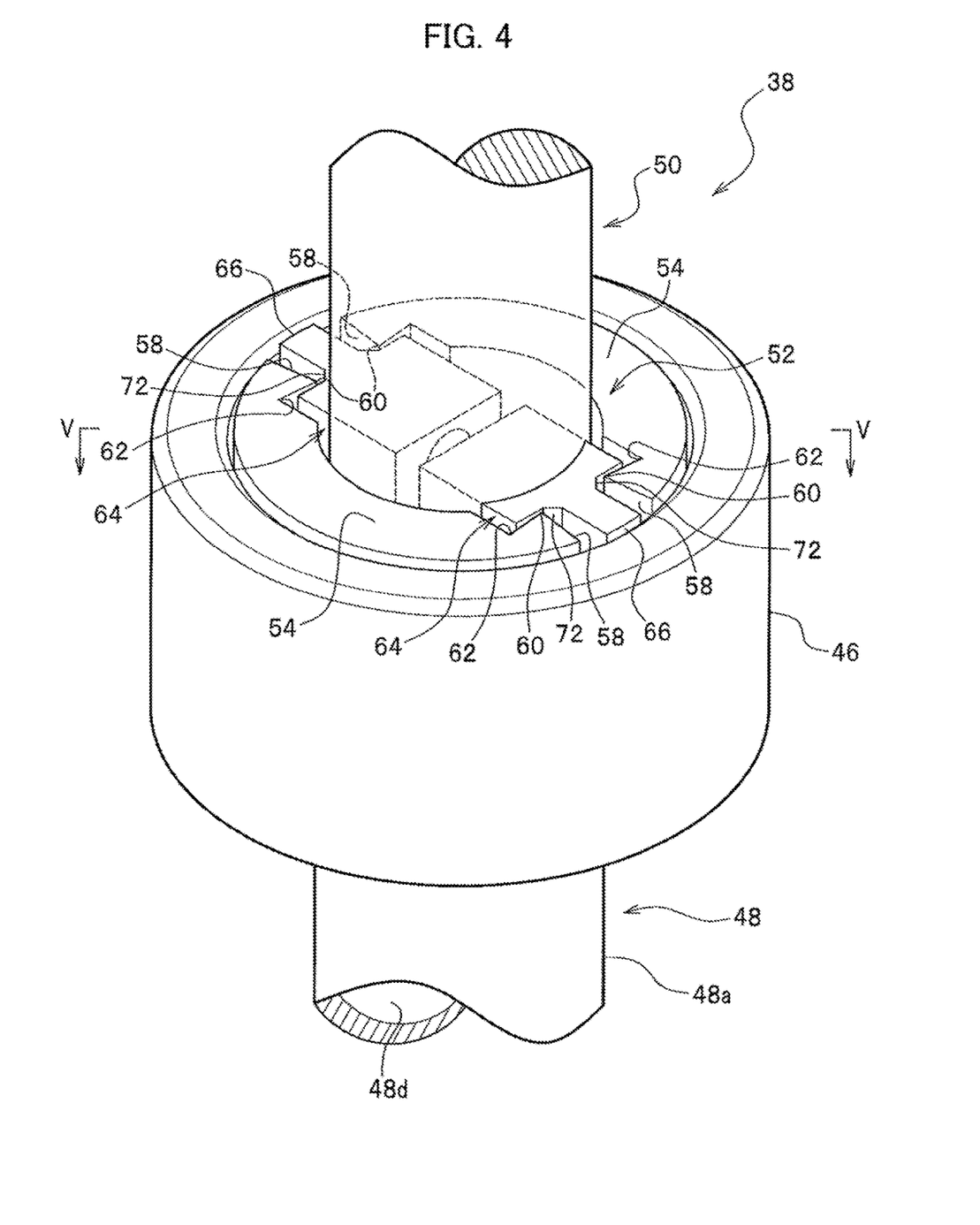
FIG. 4 is an enlarged perspective view of the lock mechanism.
Figure 5:
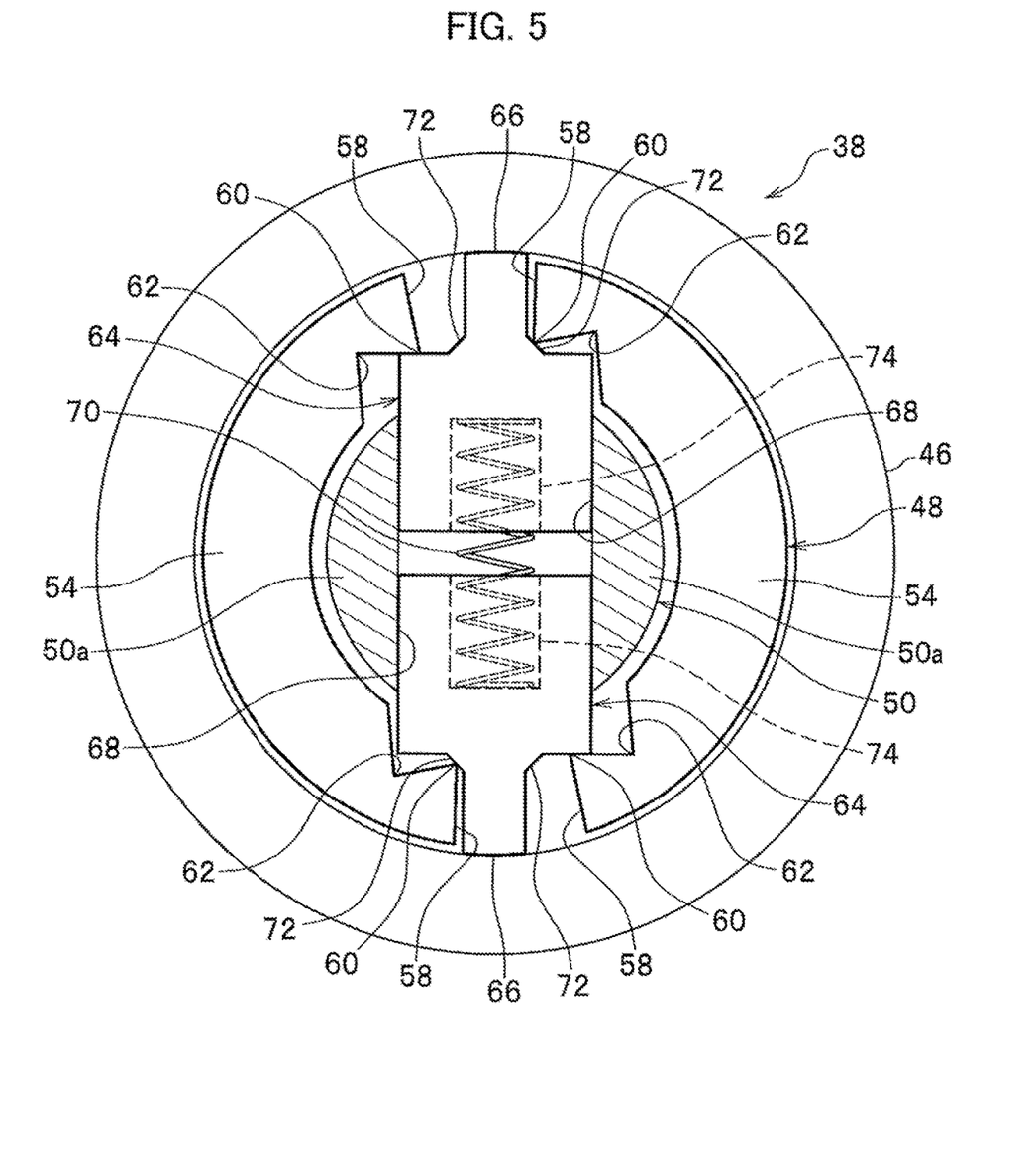
FIG. 5 is an enlarged cross-sectional view taken along line V-V in FIG. 4.

FIG. 3 is an enlarged and exploded perspective view of the lock mechanism; FIG. 4 is an enlarged perspective view of the lock mechanism; and FIG. 5 is an enlarged cross-sectional view taken along line V-V in FIG. 4. Note that FIG. 5 illustrates a friction lock state after drive of the motor 32 is stopped.

The lock mechanism 38 is disposed between the motor shaft 39 of the motor 32 and the reduction gear 34 (gear 42) (see FIG. 2). As shown in FIG. 3 and FIG. 4, the lock mechanism 38 is provided with a casing 46, an input-side shaft 48, an output-side shaft 50, and an engaging part (locking part) 52. Note that the input-side shaft 48 is connected to the motor shaft 39 (see FIG. 2). Moreover, the output-side shaft 50 is connected to the rotating shaft 40 (see FIG. 2).

As shown in FIG. 3, the casing 46 is composed of a cylindrical body having a through-hole 47 formed inside, and is fixed to the housing 28 by means of a fixing member (not shown). Note that, although the casing 46 is configured separately from the housing 28 of the toe control actuator 18 in the present embodiment, the casing 46 and the housing 28 may be configured integrally with each other.

As shown in FIG. 3, the input-side shaft 48 has a structure in which an input-side connection part 48a and a housing part 48b are integrally connected to each other via an annular stepped part 48c. The input-side connection part 48a is disposed at one end along an axial direction of the input-side shaft 48 and exposed to the outside of the casing 46 (see FIG. 4). The input-side connection part 48a is formed with a hole 48d having a bottomed cylindrical shape. A tip end of the motor shaft 39 of the motor 32 is integrally coupled to the hole 48d, e.g., by means of spline fitting.

As shown in FIG. 3, the housing part 48b is disposed at the other end along the axial direction of the input-side shaft 48 and fitted inside the casing 46 with clearance. The housing part 48b has a structure in which a pair of half-split parts 54, 54 each having a circular arc shape in cross section is formed to face each other. Moreover, a pair of slits 56, 56 is formed between end parts along a circumferential direction of the pair of half-split parts 54, 54. The pair of slits 56, 56 extends along the axial direction of the input-side shaft 48 and is spaced from each other at an angle of approximately 180 degrees in the circumferential direction to face each other in a radial direction passing through the center. The inside of the pair of half-split parts 54, 54 forms a space part for housing the output-side shaft 50 and the engaging part 52.

Moreover, a side end part 58 of a flat face is formed on each of side ends of the pair of half-split parts 54, 54 which face each other via the slit 56 in the circumferential direction. The side end part 58 has on an inner diameter side thereof a claw part (pressing part) 60 having an acute shape in cross section which is formed to project inward in the radial direction. The claw part 60 having an acute shape in cross section is provided at both of the side end parts 58, 58 along the circumferential direction of each half-split part 54, respectively.

As shown in FIG. 5, FIG. 4 and FIG. 3, the half-split part 54 has on an inside surface thereof close to the claw part 60 having an acute shape in cross section, a recess part 62 having an acute shape in cross section which is formed to become recessed outward in the radial direction. The recess part 62 having an acute shape in cross section is adapted to function as clearance for preventing the inside surface of the half-split part 54 from abutting on a friction member 64 as described later when the side end part 58 of the half-split part 54 abuts on a projection part 66 of the friction member 64.

As shown in FIG. 3, the output-side shaft 50 is composed of a pair of leg parts 50a, 50a that are housed in the housing part 48b of the input-side shaft 48 and the casing 46, and an output-side connection part 50b that connects ends on one side of the pair of leg parts 50a, 50a to each other. The pair of leg parts 50a, 50a each has a circular arc shape in cross section and is disposed to face each other. Between the pair of leg parts 50a, 50a, the engaging part 52 is mounted and a guide groove 68 for guiding displacement of the friction member 64 constituting a component of the engaging part 52 is formed along the radial direction (see FIG. 5). Note that a maximum outer diameter of the output-side connection part 50b of the output-side shaft 50 is set to be smaller than a maximum outer diameter of the input-side connection part 48a of the input-side shaft 48.

As shown in FIG. 3, the engaging part 52 includes a pair of friction members 64, 64 and a pair of coil springs (urging members) 70, 70. The pair of friction members 64, 64 each has the same shape and is provided so as to be displaceable (capable of advancing and retreating) in the radial direction along the guide groove 68 by overcoming a spring force of the pair of coil springs 70, 70.

Each friction member 64 includes a body part 65 having a nearly rectangular parallelepiped shape, the projection part 66 provided on one surface of the body part 65, and a pair of abutting parts 72, 72 provided on the joining part between the body part 65 and the projection part 66. The body parts 65, 65 facing each other with the pair of coil springs 70, 70 between the body parts each has two spring-mounting holes 74, 74 provided in the up-down direction on a side surface of the body part.

The projection part 66 is provided integrally with the body part 65 on a side surface opposite to the spring-mounting holes 74, 74 of the body part 65. The projection part 66 has the form of nearly a flat plate and is formed to extend along the axial direction of the input-side shaft 48 and the output-side shaft 50 and to project outward in the radial direction. Note that a tip end of the projection part 66 is provided to freely abut on an inside surface of the casing 46 (inner circumferential surface of the through-hole 47) and chamfered to follow the inside surface of the casing 46. Moreover, the tip end of the projection part 66 abuts on the inner circumferential surface of the through-hole 47, thereby inhibiting the input-side shaft 48 and the output-side shaft 50 from moving separately from each other by frictional force.

The pair of abutting parts 72, 72, on each of which a tip end of the claw part 60 having an acute shape in cross section abuts, is provided on both sides of the base part of the projection part 66. Each abutting part 72 is formed on an inclined surface from the projection part 66 to the body part 65 in the cross section of the friction member 64. Note that a friction lock state as described later includes both states of a contact state in which the claw part 60 having an acute shape in cross section abuts on the abutting part 72, and a non-contact state in which the claw part 60 having an acute shape in cross section does not abut on the abutting part 72. This is because, in the friction lock state, the tip end of each projection part 66 of the pair of friction members 64, 64 only need to abut on the inside surface of the casing 46 to allow the lock state to be held by the frictional force.

Figure 8:
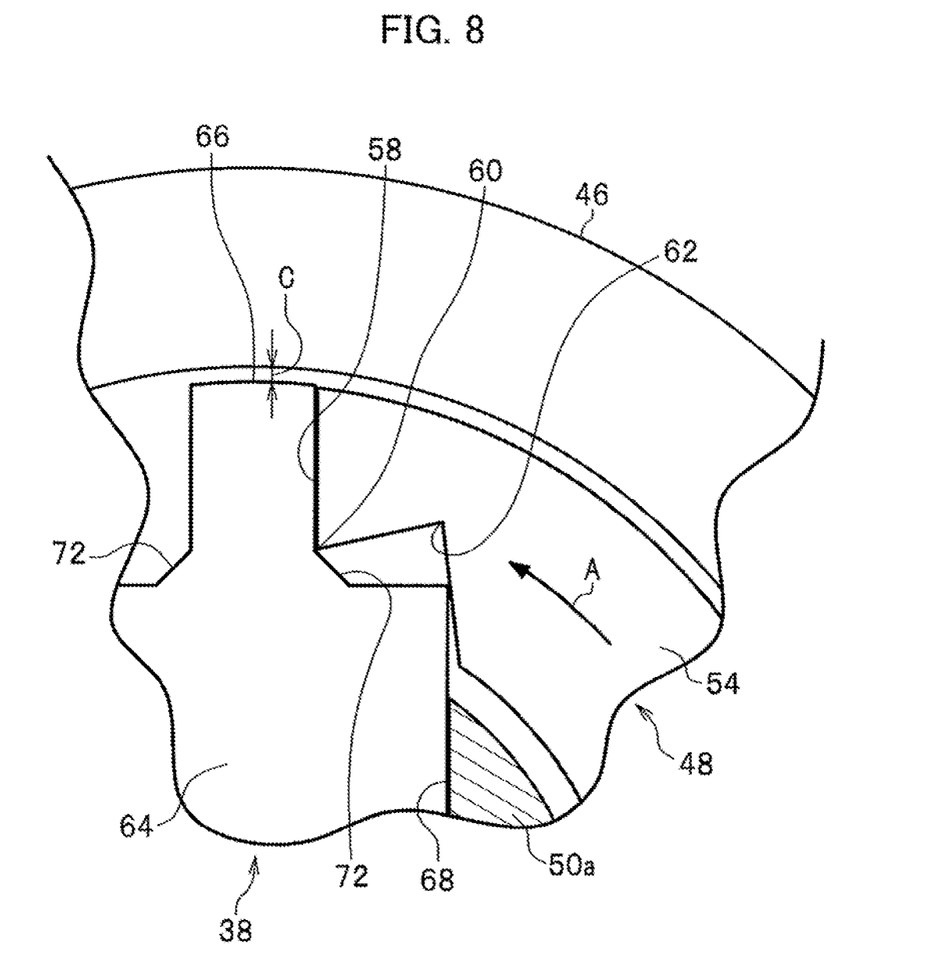
FIG. 8 is an enlarged view of the main part in FIG. 6B.

In contrast, when releasing the friction lock state, the claw part 60 having an acute shape in cross section abuts on the abutting part 72 to press the abutting part 72, thereby displacing the pair of friction members 64, 64 in a direction to allow the friction members to come near each other (inward in the radial direction), so as to allow the friction lock state to be released (see FIG. 6B and FIG. 8 as described later). In other words, the claw part 60 having an acute shape in cross section and the abutting part 72 allow a turning force by the input-side shaft 48 to be converted into a force by which the friction member 64 is retreated inward in the radial direction. Release of the friction lock state will be described in detail later.

As shown in FIG. 5, the pair of coil springs 70, 70 is interposed between the pair of friction members 64, 64 linearly disposed along the radial direction, respectively, and adapted to press (urge) the pair of friction members 64, 64 by the spring force in a direction to allow the friction members to be away from each other. The spring force of the pair of coil springs 70, 70 causes each projection part 66 of the pair of friction members 64, 64 to abut on the inside surface of the casing 46, respectively, to be brought into the lock state (friction lock state) by the frictional force. Consequently, the lock state is held in which rotation of the output-side shaft 50 is inhibited against the input from the rear wheel W side.

The rear suspension device 10 in which the lock mechanism of the toe control actuator according to the present embodiment is incorporated is basically configured as described above, and the operation and effects thereof will be described below.

Figure 6A:
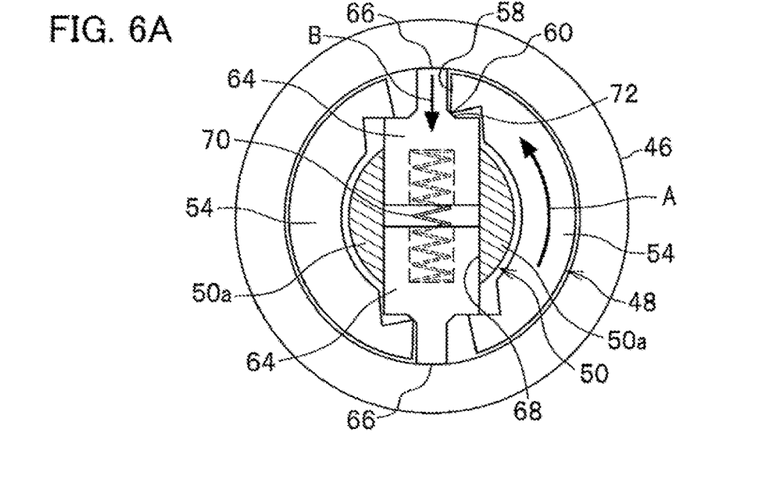
FIG. 6A is an operation explanatory view showing operation to release a friction lock state.
Figure 6B:
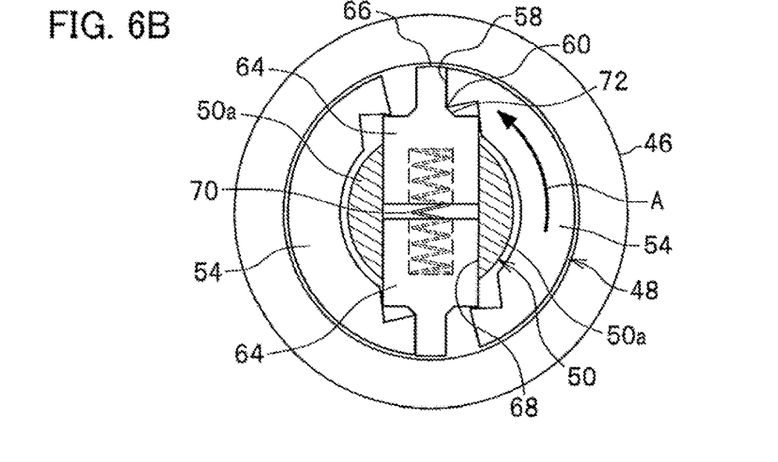
FIG. 6B is an operation explanatory view showing the operation to release the friction lock state.
Figure 6C:
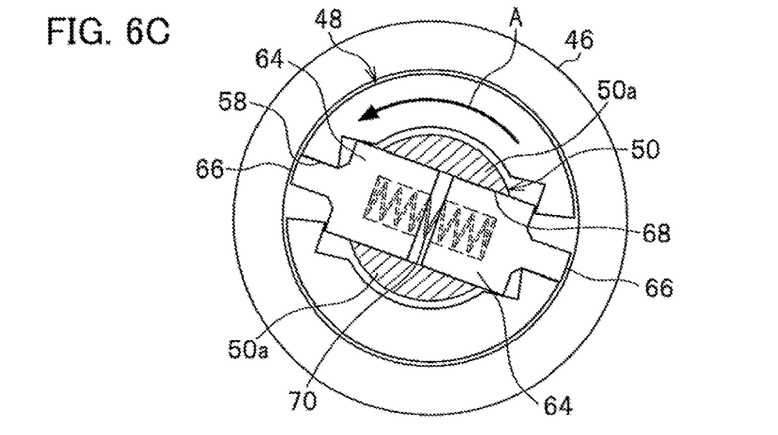
FIG. 6C is an operation explanatory view showing the operation to release the friction lock state.
Figure 7:
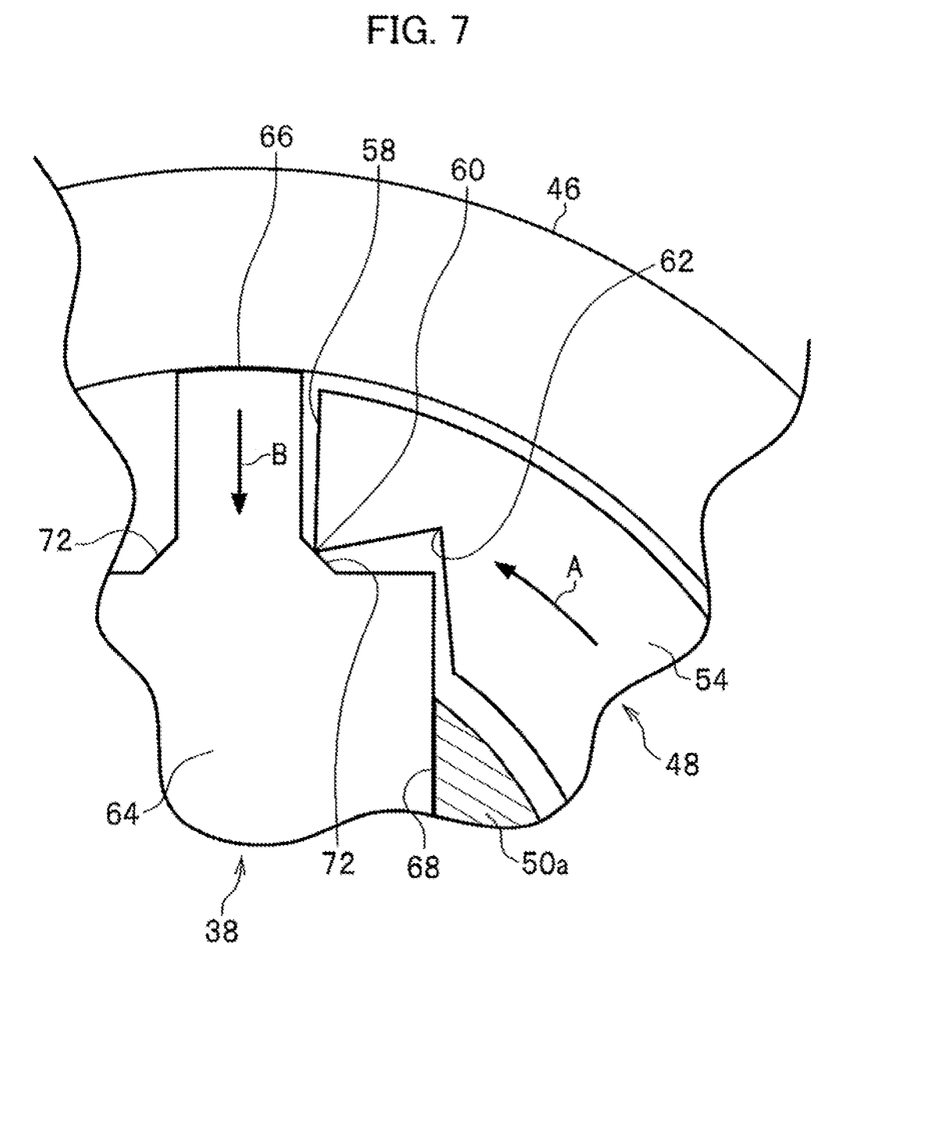
FIG. 7 is an enlarged view of a main part in FIG. 6A.

FIG. 6A, FIG. 6B and FIG. 6C are operation explanatory views showing operation to release the friction lock state in order; FIG. 7 is an enlarged view of a main part in FIG. 6A; and FIG. 8 is an enlarged view of the main part in FIG. 6B.

First, description will be given of a case in which, from the state (see FIG. 5) in which the tip end of each projection part 66 of the pair of friction members 64, 64 abuts on the inside surface of the casing 46 to allow the friction lock state to be held by the frictional force, the friction lock state is released. Note that in the friction lock state, the rotational drive of the motor 32 of the toe control actuator 18 is in a state of being stopped. Moreover, as described above, the friction lock state includes both of the contact state in which the claw part 60 having an acute shape in cross section abuts on the abutting part 72, and the non-contact state in which the claw part 60 having an acute shape in cross section is away from the abutting part 72.

When the motor 32 (see FIG. 2) is driven to rotate, rotational torque input through the rotating shaft 40 is transmitted to the input-side shaft 48 of the lock mechanism 38 to allow the input-side shaft 48 to be rotated in a direction of arrow mark A (see FIG. 6A). This rotation of the input-side shaft 48 causes the claw part (pressing part) 60 having an acute shape in cross section provided along the circumferential direction of the half-split part 54 to abut on the abutting part 72 of the friction member 64, and the claw part 60 having an acute shape in cross section allows the abutting part 72 to be pressed inward in the radial direction (a direction of arrow mark B) (see FIG. 7). This pressing force of the claw part 60 having an acute shape in cross section causes the pair of friction members 64, 64 to overcome the spring force of the pair of coil springs 70, 70 to be displaced along the guide groove 68 inward in the radial direction (the direction of arrow mark B) in which the friction members come near each other (see FIG. 6B). Consequently, each projection part 66 of the pair of friction members 64, 64 is allowed to be away from the inside surface of the casing 46, thereby releasing the friction lock state. In the released state of friction lock (lock released state), a clearance C is generated between the tip end of each projection part 66 of the pair of friction members 64, 64 and the inside surface of the casing 46 (see FIG. 8).

When the input-side shaft 48 is rotated in the direction of arrow mark A after the friction lock state is released, the side end part 58 of the input-side shaft 48 abuts on the projection part 66 of the friction member 64 and the rotational torque input from the motor 32 is transmitted via the input-side shaft 48 to the friction member 64 (see FIG. 6C).

When the input-side shaft 48 is further rotated in the direction of arrow mark A, the input-side shaft 48, the pair of friction members 64, 64, and the output-side shaft 50 are integrally rotated with the released state of friction lock being held. Consequently, the toe control actuator 18 makes it possible to allow the rotational torque of the motor 32 to be transmitted to the output-side shaft 50 to control the toe angle of the rear wheel W to be changed to an intended angle.

As described above, the present embodiment makes it possible to realize the friction lock state and the released state of friction lock with a mechanical configuration and thus to make power supply unnecessary. Moreover, the present embodiment makes it possible to easily release the friction lock state by allowing the claw part 60 having an acute shape in cross section of the input-side shaft 48 to abut on and press the abutting part 72, thus making a large torque unnecessary in releasing the friction lock state.

Moreover, the present embodiment allows the output-side shaft 50 to be connected via the gears 42, 44 to the feed screw mechanism 36 that expands and contracts the output rod 36c. With this configuration, the present embodiment makes it possible to select low friction members such as a ball screw mechanism (a ball screw shaft and a feed nut), for the feed screw mechanism 36. This makes it possible to suppress vibration of the output-side shaft 50 that outputs the rotational torque to the feed screw mechanism 36 side.

Moreover, one example of conventional art allows a reduction gear having low positive and reverse efficiencies to be employed to thereby suppress a reverse input torque transmitted from the rear wheel W side. In contrary, the present embodiment has advantageous effects in that the reduction gear 34 having high positive and reverse efficiencies can be employed because the reverse input torque transmitted from the rear wheel W side can be shut off by the lock mechanism 38.

Moreover, the present embodiment allows the pair of friction members 64, 64 to be disposed to be spaced from each other at equal angular intervals along the inner circumferential direction of the casing 46. With this configuration, the present embodiment allows multiple friction members 64 to be disposed to be spaced from each other at equal angular intervals, thereby making it possible to avoid the center of the casing 46 and the center of the output-side shaft 50 from deviating from each other to increase force with which the claw part 60 having an acute shape in cross section presses the abutting part 72. Note that, although the pair of friction members 64, 64 is disposed for multiple friction members in the present embodiment, the number of friction members to be disposed is not limited to this embodiment.

Next, description will be given of a case in which the lock mechanism 38 is applied to the rotary actuator (toe control actuator) 102.

Figure 9:
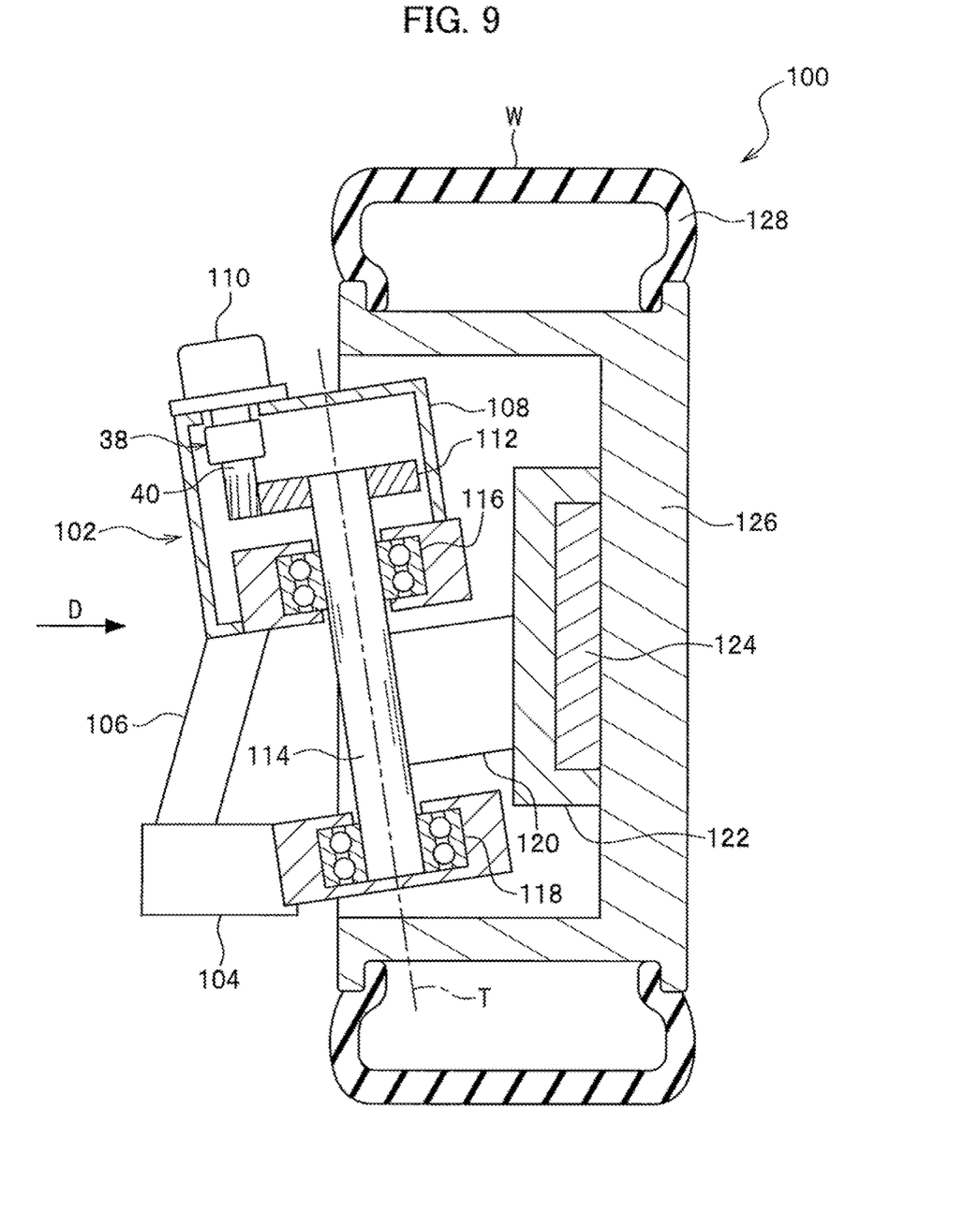
FIG. 9 is a schematic view of a rear suspension device in which a lock mechanism of a toe control actuator according to another embodiment of the present invention is incorporated, and which is viewed from a vehicle rear side.
Figure 10:
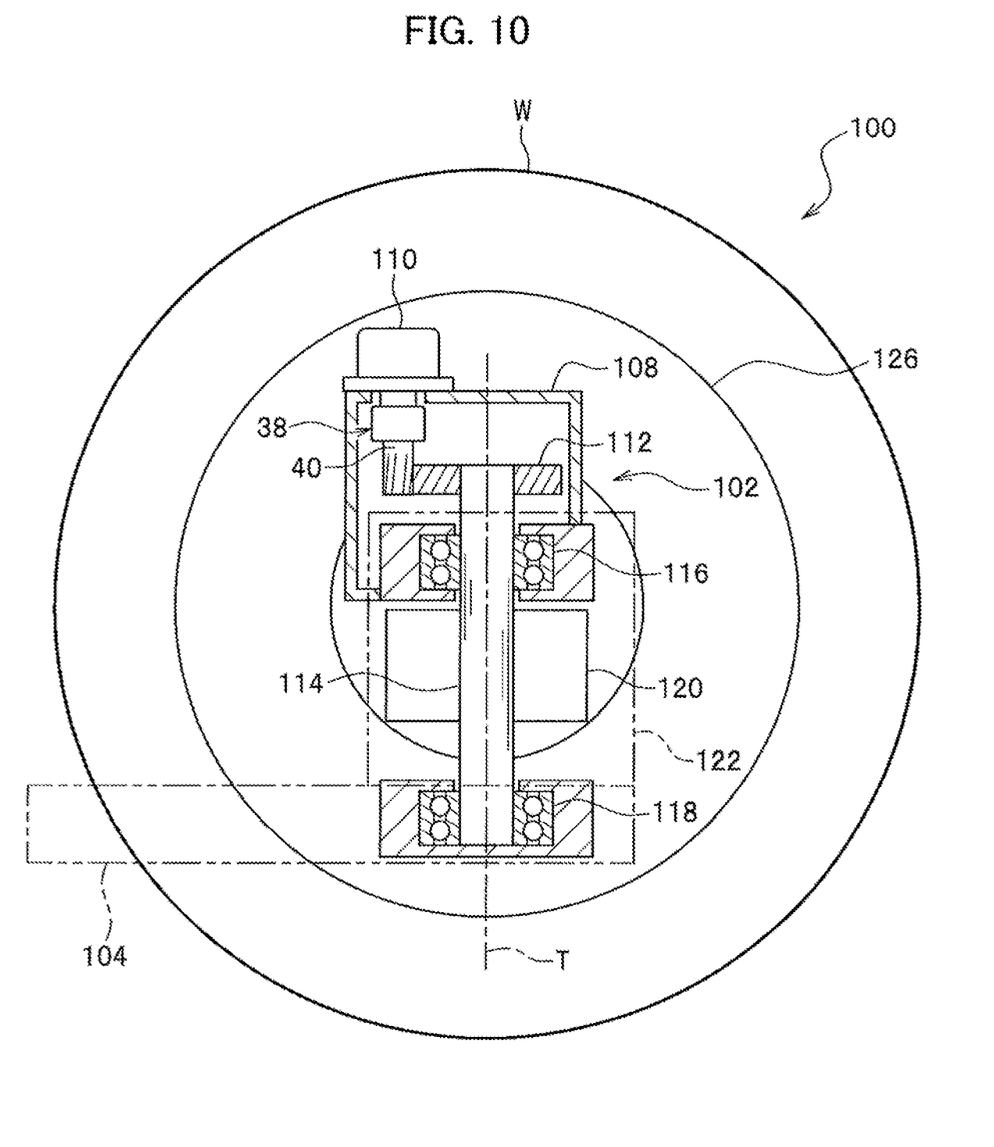
FIG. 10 is a partially perspective and schematic view of the rear suspension device which is viewed from the direction indicated by an arrow D in FIG. 9.

FIG. 9 is a schematic view of a rear suspension device in which a lock mechanism of a toe control actuator according to another embodiment of the present invention is incorporated, and which is viewed from a vehicle rear side. FIG. 10 is a partially perspective and schematic view of the rear suspension device which is viewed from the direction indicated by an arrow D in FIG. 9. Note that, in FIG. 9 and FIG. 10, the same components as the components shown in FIG. 1 to FIG. 5 are given the same reference signs, and thus detailed explanation thereof is omitted.

As shown in FIG. 9 and FIG. 10, a rear suspension device 100 is, for example, of a trailing arm type, and is disposed on a rear wheel W (only a right rear wheel W is shown in FIG. 9 and FIG. 10) of a four-wheel steering vehicle (not shown). The lock mechanism 38 incorporated in the rear suspension device 100 is different in that it is applied to the rotary actuator 102, from the embodiment described above in which the lock mechanism 38 is applied to the telescopic actuator.

The rotary actuator 102 includes a fixing member 106 that is fixed at a slant onto a trailing arm 104 when viewed from the vehicle rear side, and a casing 108 that is supported above the trailing arm 104 via the fixing member 106. The casing 108 has a motor 110 attached thereto, and the input-side shaft 48 of the lock mechanism 38 is coupled to the motor shaft 39 of the motor 110. The output-side shaft 50 of the lock mechanism 38 is coupled to the rotating shaft 40, and the rotating shaft 40 is engaged with gear teeth of a large diameter gear 112. The center of the large diameter gear 112 is coupled to an upper end of a shaft 114. The shaft 114 is provided so as to be freely rotated integrally with the large diameter gear 112. Note that in FIG. 9 and FIG. 10, illustration of the motor shaft 39, the input-side shaft 48 and the output-side shaft 50 is omitted.

Note that the trailing arm 104 extends along the front-rear direction of the vehicle and is disposed at both right and left sides in the vehicle width direction. The right and left trailing arms 104 (only the right trailing arm 104 is shown in FIG. 9 and FIG. 10) are disposed nearly in parallel with each other and coupled to each other in the vehicle width direction via a torsion beam (not shown) that extends along the vehicle width direction.

The shaft 114 is supported so as to be freely rotated by an upper bearing 116 disposed on the casing 108 side and a lower bearing 118 disposed on the trailing arm 104 side. The shaft 114 has a shaft line that functions as a steering shaft T capable of changing a toe angle of the wheel (right rear wheel W).

The shaft 114 is connected via a coupling member 120 to a knuckle 122. The shaft 114 is rotated by a predetermined angle on the shaft line (steering shaft T) as the center of rotation, thereby allowing the coupling member 120 and the knuckle 122 to be integrally rotated. The knuckle 122 is adapted to support a wheel 126 and a tire 128 via a hub (hub bearing) 124 so as to be freely rotated.

When the motor 110 is driven to rotate in a given direction, the rotational drive force is transmitted via the motor shaft 39, the input-side shaft 48, the lock mechanism 38 and the output-side shaft 50 to the large diameter gear 112. This causes the large diameter gear 112 and the shaft 114 to be integrally rotated and thus the toe angle of the rear wheel W can be changed in the toe-in direction through the coupling member 120 connected to the shaft 114, and the knuckle 122. Moreover, when the motor 110 is driven to rotate in a direction opposite to the above, the toe angle of the rear wheel W can be changed in the toe-out direction through the coupling member 120 connected to the shaft 114, and the knuckle 122.

Note that the friction lock state and the released state of friction lock in the lock mechanism 38 are the same as those in the embodiment described above, and thus detailed explanation thereof is omitted.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

18: Toe control actuator (Actuator; Telescopic actuator); 32, 110: Motor; 36: Feed screw mechanism; 38: Lock mechanism: 46: Casing; 48: Input-side shaft; 50: Output-side shaft; 52: Engaging part (Locking part); 58: Side end part; 60: Claw part having acute shape in cross section (Pressing part); 64: Friction member; 66: Projection part; 70: Coil spring (Urging member); 72: Abutting part; 102: Rotary actuator; W: Rear wheel

What is claimed is:

1. A lock mechanism of an actuator, which is provided in the actuator capable of changing a toe angle of a wheel by rotational drive of a motor and configured to lock operation of the actuator when the rotational drive of the motor is stopped, the lock mechanism comprising:
   a casing provided integrally with or separately from a housing of the actuator;
   an input-side shaft connected to a motor shaft of the motor and rotatably held in the casing;
   an output-side shaft to which rotational torque is transmitted from the input-side shaft; and
   a locking part that includes:
      at least one friction member;
      a pressing part and a side end part each provided on the input-side shaft; and
      an urging member for urging the friction member,
   wherein
   the friction member comprises:
      a body part;
      a projection part projecting from the body part outward in a radial direction and configured to abut against an inside surface of the casing; and
      an abutting part provided on a joining part between the body part and the projection part, the abutting part including an inclined surface extending inclinedly from the projection part to the body part,
   when the rotational drive of the motor is stopped, an urging force of the urging member causes the projection part of the friction member to abut against the inside surface of the casing to be brought into a friction lock state;
   when the motor is driven to rotate, the pressing part of the input-side shaft abuts and presses against the inclined surface of the abutting part of the friction member to allow the projection part of the friction member to be away from the inside surface of the casing so as to release the friction lock state; and
   after the friction lock state is released, the side end part abuts against the projection part of the friction member and the rotational torque of the motor is transmitted from the input-side shaft to the output-side shaft via the friction member to allow the toe angle of the wheel to be changed.

2. The lock mechanism of the actuator, as set forth in claim 1, wherein
   the actuator is composed of a telescopic actuator provided with a feed screw mechanism that expands and contracts an output rod, and the output-side shaft is connected to the feed screw mechanism.

3. The lock mechanism of the actuator, as set forth in claim 2, wherein
   the casing has a cylindrical shape, and
   the at least one friction member includes multiple friction members that are disposed to be spaced from each other at equal angular intervals along an inner circumferential direction of the casing.

4. The lock mechanism of the actuator, as set forth in claim 1, wherein
   the casing has a cylindrical shape, and
   the at least one friction member includes multiple friction members that are disposed to be spaced from each other at equal angular intervals along an inner circumferential direction of the casing.

* * * * *